United States Patent
Botzer et al.

(10) Patent No.: US 7,010,525 B2
(45) Date of Patent: Mar. 7, 2006

(54) METHOD AND SYSTEM FOR ENSURING SYSTEM AWARENESS WITH DATA BASE CONNECTION ON DEMAND

(75) Inventors: David Botzer, Haifa (IL); Opher Etzion, Haifa (IL); Tali Yatzkar-Haham, Moshav Ya'ad Misgav (IL)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 10/131,232

(22) Filed: Apr. 25, 2002

(65) Prior Publication Data

US 2003/0204491 A1    Oct. 30, 2003

(51) Int. Cl.
*G06F 17/30* (2006.01)
(52) U.S. Cl. .............................. 707/4; 707/3
(58) Field of Classification Search .................... 707/3, 707/4, 104.1; 719/318; 706/46, 59; 717/136
See application file for complete search history.

(56) References Cited

U.S. PATENT DOCUMENTS

| | | | |
|---|---|---|---|
| 5,664,172 A * | 9/1997 | Antoshenkov | 707/4 |
| 5,748,098 A | 5/1998 | Grace | |
| 5,819,092 A * | 10/1998 | Ferguson et al. | 717/113 |
| 6,006,016 A | 12/1999 | Faigon et al. | |
| 6,208,720 B1 | 3/2001 | Curtis et al. | |
| 6,289,334 B1 * | 9/2001 | Reiner et al. | 707/3 |
| 6,427,146 B1 * | 7/2002 | Chu | 707/3 |
| 6,629,151 B1 * | 9/2003 | Bahl | 709/250 |
| 2002/0188522 A1 * | 12/2002 | McCall et al. | 705/26 |
| 2003/0200169 A1 * | 10/2003 | Freeny, Jr. | 705/37 |
| 2004/0030741 A1 * | 2/2004 | Wolton et al. | 709/202 |
| 2004/0073506 A1 * | 4/2004 | Tull et al. | 705/36 |

OTHER PUBLICATIONS

McCarthy et al, "The Architecture of an Active Data Base Management System", ACM 1989, pp. 215-224.*

* cited by examiner

*Primary Examiner*—Uyen Le
(74) *Attorney, Agent, or Firm*—Browdy and Neimark, PLLC

(57) ABSTRACT

A method and system for establishing a situation for use in an event-driven application receives one or more events, and queries an external database for obtaining auxiliary data defining relevant external knowledge for detecting the situation. The event or events are integrated with the auxiliary data for generating a composite event defining the situation. The database query is constructed in real time based on the received events with a query language using SQL primitives.

30 Claims, 2 Drawing Sheets

US 7,010,525 B2

METHOD AND SYSTEM FOR ENSURING SYSTEM AWARENESS WITH DATA BASE CONNECTION ON DEMAND

FIELD OF THE INVENTION

This invention relates to event-driven systems and, in particular, to a method for ensuring the currency of events that have distributed components.

BACKGROUND OF THE INVENTION

Reactive applications relate to a class of applications that are event-driven and configured to operate upon detection of events. The exact timing and content of such events are not usually known in advance. Many tools in different areas have been built to detect events, and to couple their detection with appropriate actions. These tools exist in products that implement active databases, event management systems, the "publish/subscribe" mechanism, real-time systems and similar products. Most current reactive systems respond to a single event.

A known problem in many reactive applications is the gap between the events that are supplied by an event source and situations to which the clients are required to react. In order to bridge this gap, the client must monitor all the relevant events and apply an ad hoc decision process in order to determine whether the conditions for reactions have been met.

U.S. Pat. No. 6,208,720 (Curtis et al.) issued Mar. 27, 2001 and entitled "System, method and computer program product for a dynamic rules-based threshold engine" discloses a configurable and scalable rules-based system for processing event records including a core infrastructure and a configurable domain-specific implementation. The domain-specific implementation is provided with user specific data and rules. The core infrastructure includes an event record enhancer which enhances events with additional data and a threshold detector which determines whether an enhanced event record, alone or in light of prior event records, exceeds one or more thresholds. The enhancer can access external databases for additional information related to an event record. The threshold detector selects one or more threshold rules from a database of threshold rules for applying to the enhanced event records. Where enhanced event records are in the form of feature vectors containing features and feature values, the threshold detector selects one or more threshold rules based upon the features or feature values in the vector. Where the feature vector includes a threshold for a feature value, the threshold detector tests the feature values against the threshold. The threshold detector may access prior event records in order to apply one or more threshold rules.

Thus, while such a system employs an external database that is used by the thresholding engine, the external database is used to store threshold rules that may be modified dynamically during run-time. The threshold detector receives enhanced event records and selects one or more threshold rules from the threshold database. The threshold rules indicate how the thresholding engine must react to specified events. For example, a system for detecting tele-communication fraud may require that event records be monitored in order to detect when a threshold has been exceeded. The event could be calling a targeted telephone number and the threshold could be set to a number of calls so as to warn an operator when more than this threshold number of calls is made to the targeted telephone number. Thus, although the threshold extracted from the database sets a limit to a specific event it does not constrain the event in any way. That is to say the event of dialing the targeted telephone number occurs regardless of the threshold and it is only after the event has occurred that correlation with the database is required, in order to determine whether the event is significant or not.

U.S. Pat. No. 6,006,016 (Faigon et al.) issued Dec. 21, 1999 discloses a method and apparatus for correlating faults in a networking system. A database of fault rules is maintained along with and associated probable causes, and possible solutions for determining the occurrence of faults defined by the fault rules. The fault rules include a fault identifier, an occurrence threshold specifying a minimum number of occurrences of fault events in the networking system in order to identify the fault, and a time threshold in which the occurrences of the fault events must occur in order to correlate the fault. Occurrences of fault events in the networking system are detected and correlated by determining matched fault rules which match the fault events and generating a fault report upon determining that a number of occurrences for the matched fault rules within the time threshold is greater than or equal to the occurrence threshold for the matched fault rules.

In such a system a fault constitutes an event that must be trapped and monitored. Here, too, only those faults whose frequency exceeds a certain threshold are of interest but no access to an external database is disclosed.

U.S. Pat. No. 5,748,098 (Grace) issued May 5, 1998 discloses a method event correlation method for a general purpose event analyzer, which records events historically in time windows and calculates correlations based on probability of events occurring together in same window. Simultaneous events reported to an equipment management system are compared with historical data in order to establish whether there is a relationship between the events. Historical data is used to determine the probability of the events occurring independently simultaneously. If this probability is below a predetermined threshold this will suggest that the events are not independent, but are related. The historical database may be updated by further event occurrences as they are reported to the equipment management system, thereby enlarging the database to make the results more statistically accurate. Events may be reported to the system automatically or by human agency. To allow for systematic delays in event reporting, alarms from one source may be compared with alarms from another source occurring a fixed time later or earlier.

Thus, this reference also discloses use of an external database, although in this case it is used for storing historical data so as to determine whether simultaneous events (occurring within a temporal window) are mutually dependent or not. Thus, here again, the database allows events to be analyzed after their occurrence but is not used to constrain the events, which have already occurred.

In summary, current event management tools process data that is 'pushed' towards them. That is, they obtain all the needed information as incoming events. This forces limitations on their capabilities. When part of the needed information is not given by the incoming events there are two possibilities to overcome it.

One solution is to periodically capture the state of the needed information in the database, and send it as events to the system. This solution has two main drawbacks: (1) it can enlarge dramatically the communication traffic and result in a large volume of redundant information that is being sent and processed; (2) the data that is being supplied does not necessarily remain accurate when it is being used.

A second solution is to detect situations based on partial knowledge. This reduces the effectiveness of the tool, and obliges the client to complete the detection.

It would therefore be advantageous to combine the information that is given by incoming events together with the possibility to access a database if some additional information is needed.

By way of example, consider a situation where a preferred client wishes to be alerted if at least two out of four stocks have risen by 5 percent since the start of the trading day, where the incoming events are stock quotes and the information on preferred customers is kept in a bank database. Another example might be a client wishing to activate an automatic "buy or sell" program if, for any stock that belongs to a predefined list of stocks that are traded in two stock markets, there is a difference of more than 5 percent between the values of the stock in different stock markets, where the time difference of the reported values is less than 5 minutes ("arbitrage"), and the client has sufficient funds in his or her bank account. The incoming events are stock quotes from various stock markets and the client bank account is accessed from the bank database.

The above-referenced prior art systems cannot address this need. It would therefore clearly be desirable to provide an improved mechanism for integrating an event with external data that is used in combination with one or more incoming events to define a situation to which an application must react. A situation is thus a reactive entity that receives events as input, combines composition filtering, content filtering and context filtering, and detects situations as output. The composition filtering is defined by composition operators.

SUMMARY OF THE INVENTION

It is therefore an object of the invention to provide an improved method and system for establishing a situation that depends on one or more events but is conditioned also by factors that are external to the constituent events.

This object is realized in accordance with a broad aspect of the invention by a method for establishing a situation for use in an event-driven application, said method comprising the steps of:
  (a) receiving one or more events,
  (b) querying an external database for obtaining auxiliary data defining relevant external knowledge for detecting the situation, and
  (c) integrating the event or events with the auxiliary data for generating a composite event defining said situation.

According to a second aspect of the invention there is provided a situation manager comprising:
  an event unit for receiving one or more input events,
  a database engine for querying an external database for obtaining auxiliary data defining relevant external knowledge for detection of the situation, and
  an integration unit coupled to the input unit and to the database engine for integrating the input event or events with the auxiliary data for establishing occurrence of a composite event defining the situation.

Database connectivity enables the situation manager to extract data from one or more external databases at run time. Thus, in cases where the situation detection process depends on information that is not part of the events' data but is kept in external databases, the relevant data can be extracted as required. The resultant situation is thereby always dependent on the instantaneous values of the extracted data, which can be time varying thus allowing dynamic events to be established as well as static ones.

Database connectivity also enables combinations of database queries in the situation manager's condition clauses. Database queries can be part of any condition of the situation manager, such as a global condition related to all the situation's events, threshold condition on a situation-specific operand, conditions on the situation context and so on. If a condition contains a database query, the query will be sent to the database at the condition evaluation time.

Database queries can be part of any expression and condition clauses of the situation manager. The query syntax can be either any SQL query or a unique short syntax that enable the user to write queries in a very simple way, that is similar to the way the user refers to attribute value of event. This simple syntax frees the user from being familiar with the SQL syntax, the query is implied, and is generated automatically.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

Figure 1:
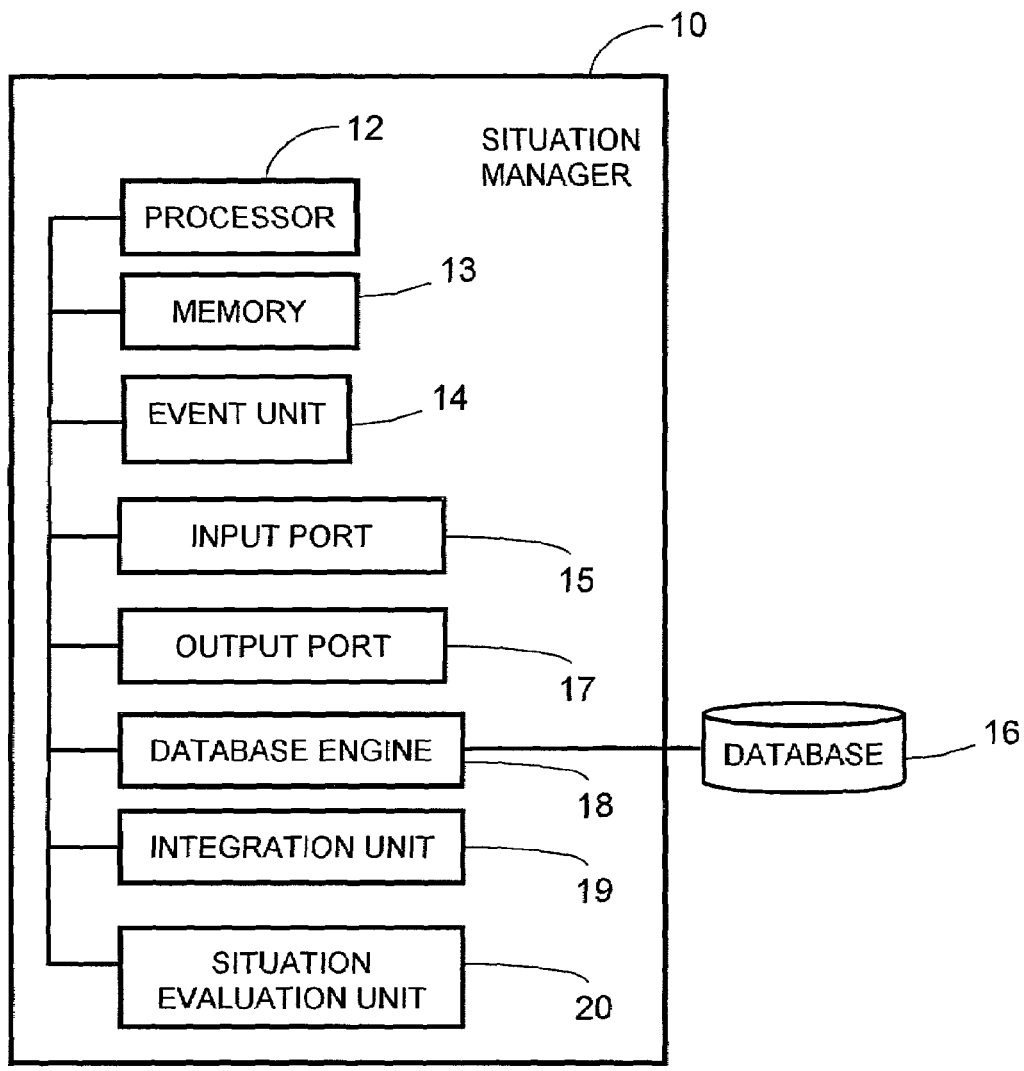
FIG. 1 is a block diagram showing functionally a situation manager according to the invention.
Figure 2:
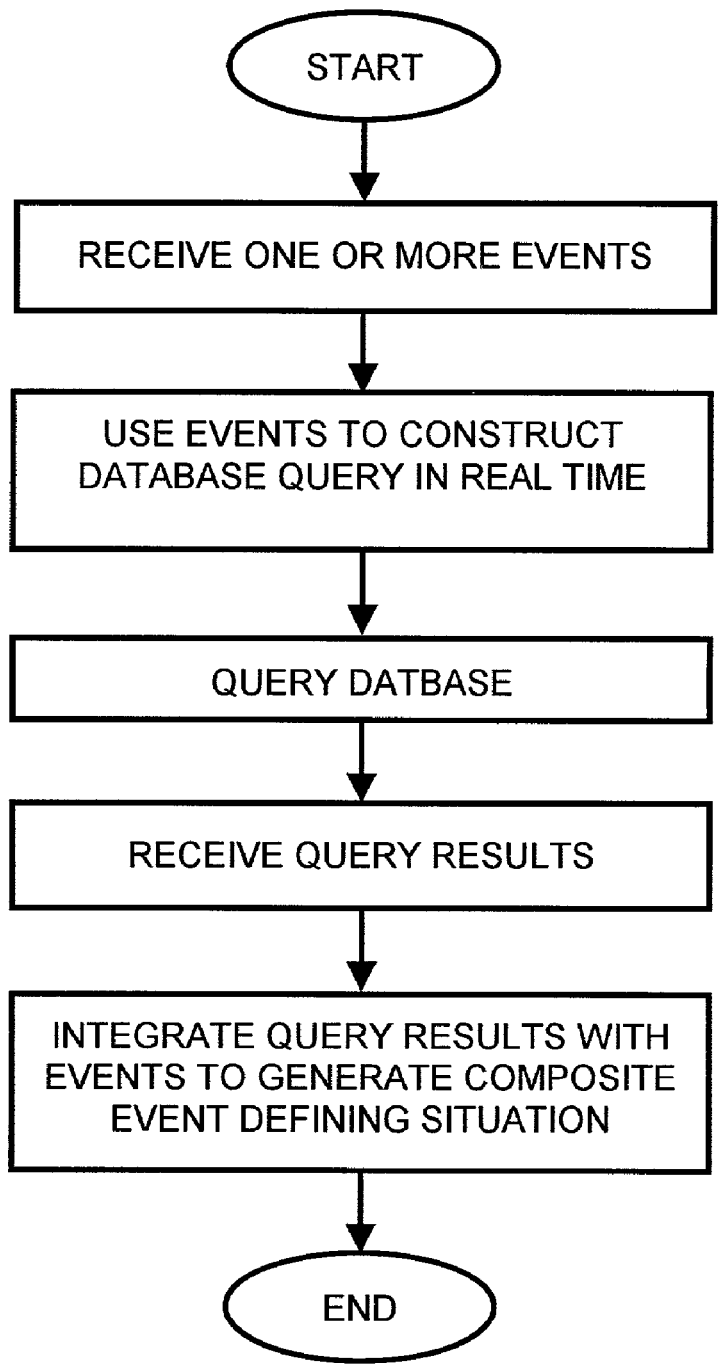
FIG. 2 is a flow diagram showing the principal operating steps carried out by the situation manager shown in FIG. 1.

FIG. 1 is a block diagram showing functionally a situation manager depicted generally as 10 according to the invention for establishing a situation. The situation manager 10 includes a processor 12 coupled to a memory 13 storing computer program code in accordance with which the situation manager 10 establishes a situation. The situation is established upon occurrence of one or more events, which are "pushed" to the situation manager 10 in known manner in combination with auxiliary data defining relevant external knowledge for detection of the situation. The situation manager includes an event unit 14 for receiving one or more input events via an input port 15 to which events may be fed and to which an external database 16 may be coupled. An output port 17 allows the situation manager 10 to be coupled to an external device, such as a computer that is responsive to a desired situation being detected by the situation manager 10. A database engine 18 is coupled to the event unit 14 for querying the external database 16 for obtaining auxiliary data, and an integration unit 19 coupled to the event unit 14 and to the database engine 18 integrates the input event or events with the auxiliary data for establishing occurrence of a composite event, defining the situation. A situation evaluation unit 20 evaluates whether the composite event corresponds to the predetermined situation, and as noted above may be fed to an external device via the output port 17.

In one aspect, the invention relates to a new query language, which for the sake of description will be presented as an embedded SQL query whose syntax supports an SQL query in the original SQL syntax; or, alternatively, an implied SQL query. The implied query supports a short form of writing, which is translated to an SQL query by the system and has syntax of the form:

<table-name>.<property> [<condition>]

where:
<table-name> is a name of a database table,
<property> is a name of a property whose value should be returned,
<condition> is a condition that identifies the record.

EXAMPLE

Printers_Table.Printer_Name[ID=101]

This type of query is translated to SQL as: "select <property> from <table-name> where <condition>" e.g. select Printer_Name from Printers_Table where ID=101. The term Printers_Table.Printer_Name[ID=101] is a shorthand form of a logic construct which is expanded to an SQL query.

Values Returned from a Query:

A query may return two types of information:

Exists (Existential Quantifier) Value:

If a query is preceded by the keyword EXISTS, the query is considered as a predicate which returns TRUE if the query returns a non empty value, and FALSE otherwise.

Database Values

These are values that are returned from the query evaluation process by the database. By default, each query returns a database value. The specification of the prefix EXISTS designates the existential predicate semantics.

EXAMPLES

In the following examples references will be made to three companies and it should be noted that:
IBM is a registered trademark of International Business Machines Corporation of New York, USA
HP is a registered trademark of Hewlett-Packard, Palo Alto, Calif., USA and
Intel is a registered trademark of Intel Corporation, Santa Clara, Calif., USA.
Assume that the database contains the following table:

| Printer_ID | Manufacturer |
|---|---|
| 101 | HP |
| 105 | HP |
| 111 | IBM |

And an e1 instance of the PRINTER_ERROR event with the following properties has arrived:

| Printer_ID | Manufacturer |
|---|---|
| 101 | HP |

In this connection, it should be noted that an instance in general is a single individual from a class. E1 is usually the class and e1 that belongs to E1 as expressed by the notation: $e1_{531}$ E1. The e1 instance is a particular event from this class that actually arrives on run-time.

1. An Existential Query:

Where {"EXISTS SQL (select Printer_ID from Printers_Table where Manufacturer=HP)"}

The first where condition operates on the result returned by the SQL showed for convenience inside brace brackets and will be evaluated to TRUE because the SQL returns a non empty result (2 values).

2. Database Values Query:

Where {"101=SQL (select Printer_ID from Printers_Table where Manufacturer=IBM)"}

The result of the SQL query is "111" and since 101 is not equal to 111, the result of the Database is "False".

Static and Dynamic Queries

A query can be static or dynamic. A query is called static if all its parameters are constants (e.g. select Printer_Name from Printers_Table where ID=101).

A query is called dynamic if some of its parameters are unknown at query definition time, and should be substituted with values of event instances at run-time. When a parameter value should be substituted, the property name is marked with #.

EXAMPLE

Select Printer_Name from Printers_Table where ID=#e1.ID

At run time, the property that is marked with # will be replaced with value of the property ID, of the event e1. A query will be sent to the database when the condition which contains it is needs to be evaluated.

Connection to Database

The user defines a database that will be queried on run time. This definition includes the protocol and sub-protocol that should be used to access the database and optionally can include a user-name and password.

Connection to a database may be implemented through a JDBC interface, but this is not obligatory. JDBC is a Java component which enables communication to a wide range of relational databases using SQL queries. Java is a registered trademark of Sun Microsystems, Inc.

EXAMPLE

In order to make it clearer how the composite event is determined and to clarify such aspects as the connection to the database on run time, sending SQL queries to the database, receiving an answer to the query and associating with other event to generate a composite event, there with now be described a relatively comprehensive example from the stock market domain.

Assume we have the following table in our Stock database.

TABLE I

| | Customers_preferences | | |
|---|---|---|---|
| Preference_no | Name | Stock_description | Upper_value |
| 1 | Steve | IBM | 200 |
| 2 | Jim | IBM | 130 |
| 3 | Jim | HP | 100 |
| 4 | Tim | HP | 50 |

TABLE I-continued

Customers_preferences

| Preference_no | Name | Stock_description | Upper_value |
|---|---|---|---|
| 5 | Hope | IBM | 100 |
| 6 | Hope | INTEL | 99 |

The incoming events are from one class: stock_report. The event stock_report includes the following attributes: name, date, time, value.

It will now be assumed that we want to report about the following situations:

Sit#1: Report if a stock_report event about "IBM" stock occurred and there is at least one customer who is interested in "IBM" stock.

Sit#2: Report if the same stock were reported twice and for at each stock_report event there was at least one customer for whom the reported stock value crossed his upper value (according to Customer_preferences table).

The following pseudo-code makes clear how these reports can be expressed, using the database connections capabilities, and how the situation is evaluated on run-time.

Sit#1 definition:
S1=all(Stock_report)
   Where (Stock_report.name="IBM") and
      ("EXISTS SQL(select Preference_no from Customer_preferences where Stock_description="IBM"))
   At run-time suppose the following event instance arrives:
   stock_report: IBM, Mar. 25, 2002, 09:56, 123
S1 is evaluated as follows:
   Stock_report event occurred, so "all(Stock_report)" is relevant.
   Stock_report.name of this event instance is equal to "IBM", so this condition is evaluated to TRUE.
   (EXISTS SQL(select Preference_no from Customer_preferences where Stock_description="IBM")). There are 3 records (values) in the Customer_preferences table for which Stock_description is "IBM", so this query returns a non-empty result, and the "EXISTS" query is evaluated to TRUE. As a result situation S1 is detected.

It should be noted that in the above example, the "SQL" query is a static query because all the query's parameters are constants.

Sit#2 definition:
S2=atleast 2(Stock_report)
   Key(Stock_report.name)
   Where
   (EXISTS (Customers_preferences.Upper_value [stock_description=#Stock_report.name]<Stock_report.value))

The term "Key" is also part of the shorthand syntax of the query language and denotes that the situation requires that the stock name be the same in the at least two stock reports. It will be understood that the same desideratum can also be realized using regular SQL constructs.

At run-time suppose the following event instances arrive:
event 1 . . .
event 2 . . .
event 3 . . .
stock_report: IBM, Mar. 25, 2002, 09:56, 133
event 4 . . .
event 5 . . .
event 6 . . .
event 7 . . .
. . .
stock_report: IBM, Mar. 25, 2002, 10:42, 134
. . .

and suppose the contents of the Customer_preferences table do not change during run-time.

S2 is evaluated as follows:
   Two Stock_report event instances occurred, so "atleast 2 (Stock_report)" is relevant.
   IBM was the name of the stocks in both event instances thus satisfying the requirement that the stock names are the same in the at least two stock report. So we can move on to evaluate the "where" condition.
   In this case, #Stock_report.name is a dynamic para-meter in the SQL query. In both Stock_report instances there was at least one customer for whom the stock name (in this case-"IBM") is included in his preferences and satisfies the upper_value condition. So, the entire "where" condition is evaluated to TRUE. As a result S2 will be detected.

It will be apparent that modifications may be made to the specific implementation without departing from the scope of the invention as defined in the appended claims. For example, while use of SQL is described, it will be appreciated that this enhances portability and the invention can equally well employ other query languages.

It will also be understood that the situation manager according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the method claims that follow, alphabetic characters and Roman numerals used to designate claim steps are provided for convenience only and do not imply any particular order of performing the steps.

The invention claimed is:

1. A computer configured as a situation manager for use in an event-driven application for establishing a situation having at least one external constraint associated therewith, the situation manager comprising:

an event unit for receiving one or more input events, a processor for processing said events for generating a composite event relating to said situation, a database engine for executing a database query for obtaining auxiliary data related to the at least one external constraint, a situation evaluation unit coupled to the database engine for evaluating the situation using the auxiliary data and the composite event so as to limit a scope of the composite event to specific instances that match the database query, and an output port configured for coupling to an external device that is responsive to said situation being detected for feeding thereto data representative of the composite event.

2. The computer according to claim 1, wherein the database engine is configured to use a query language that is responsive to one or more events received by the event unit for constructing a database query in real time.

3. The computer according to claim 2, wherein the query language uses SQL primitives.

4. The computer according to claim 2, wherein the query language includes an operand that operates on one or more database values and returns a logic TRUE or FALSE value according to whether said database values conform to a defined logic construct.

5. The computer according to claim 4, wherein said logic construct is constructed using SQL primitives.

6. A program storage device readable by machine, tangibly embodying a program of instructions executable by the machine to perform method steps for use in an event-driven application for establishing a situation having at least one external constraint associated therewith, said method comprising:
   (a) receiving one or more events,
   (b) processing said events for generating a composite event relating to said situation;
   (c) executing a database query for obtaining auxiliary data related to the at least one external constraint;
   (d) evaluating the situation using the auxiliary data and the composite event so as to limit a scope of the composite event to specific instances that match the database query; and
   (e) feeding data representative of the situation to an external device that is responsive to said situation being detected.

7. A computer program product comprising a computer useable medium having computer readable program code embodied therein for use in an event-driven application for establishing a situation having at least one external constraint associated therewith, said computer program product comprising:
   computer readable program code for causing the computer to receive one or more events,
   computer readable program code for causing the computer to process said events for generating a composite event relating to said situation;
   computer readable program code for causing the computer to execute a database query for obtaining auxiliary data related to the at least one external constraint
   computer readable program code for causing the computer to evaluate the situation using the auxiliary data and the composite event so as to limit a scope of the composite event to specific instances that match the database query; and
   computer readable program code for causing the computer to feed data representative of the situation to an external device that is responsive to said situation being detected.

8. A program storage device readable by machine, tangibly embodying a program of instructions executable by the machine to perform method steps for establishing in an event-driven application a situation that depends on one or more constituent events that include at least one conditional event having external conditions associated therewith, said method comprising:
   (a) receiving said one or more constituent events;
   (b) in respect of each of said conditional events, querying an external database for obtaining auxiliary data defining whether the conditional event is relevant to the situation;
   (c) integrating said constituent events for generating a composite event relating to said situation only if all the conditional events are determined to be relevant to the situation; and
   (d) feeding data representative of the composite event to an external device that is responsive to said situation being detected.

9. A computer program product comprising a computer useable medium having computer readable program code embodied therein for use in an event-driven application for establishing a situation that depends on one or more constituent events that include at least one conditional event having external conditions associated therewith, said computer program product comprising:
   computer readable program code for causing the computer to receive said one or more constituent events,
   computer readable program code for causing the computer to query an external database for obtaining auxiliary data defining whether the conditional events are relevant to the situation,
   computer readable program code for causing the computer to integrate the constituent events for generating a composite event relating to said situation only if all the conditional events are determined to be relevant to the situation, and
   computer readable program code for causing the computer to feed data representative of the composite event to an external device that is responsive to said situation being detected.

10. A computer implemented method for use in an event-driven application for establishing a situation that depends on one or more constituent events that include at least one conditional event having external conditions associated therewith, said method comprising:
    (a) receiving the one or more constituent events,
    (b) in respect of each of said conditional events, querying an external database for obtaining auxiliary data defining whether the conditional event is relevant to the situation;
    (c) integrating said constituent events for generating a composite event relating to said situation only if all the conditional events are determined to be relevant to the situation; and
    (d) feeding data representative of the composite event to an external device that is responsive to said situation being detected.

11. The method according to claim 1, further including executing a database query for obtaining auxiliary data related to the situation for evaluating whether the composite event corresponds to said situation so as to limit a scope of the composite event to specific instances that match the database query.

12. The method according to claim 10, wherein querying the external database includes using a query language to construct in real time a database query based on the events received.

13. The method according to claim 12, wherein the query language using SQL primitives.

14. The method according to claim 12, wherein the query language include an operand that operates on one or more database values and returns a logic TRUE or FALSE value according to whether said database values conform to a defined logic construct.

15. The method according to claim 14, wherein said logic construct is constructed using SQL primitives.

16. The method according to claim 12, wherein the database query is a static query using constant query parameters.

17. The method according to claim 12, wherein the database query is a dynamic query using query parameters that change during run time.

18. A computer configured as a situation manager for use in an event-driven application for establishing a situation that depends on one or more constituent events that include at least one conditional event having external conditions associated therewith, the situation manager comprising:
  an event unit for receiving the one or more constituent events,
  a database engine for querying an external database for obtaining auxiliary data defining whether the conditional events are relevant to the situation,
  an integration unit coupled to the event unit and to the database engine for integrating said constituent events for generating a composite event relating to the situation only if all the conditional events are determined to be relevant to the situation, and
  an output port configured for coupling to an external device that is responsive to said situation being detected for feeding thereto data representative of the composite event.

19. The computer according to claim 18, wherein the situation manager further comprises:
  a situation evaluation unit for querying the database for obtaining auxiliary data related to the situation for evaluating whether the composite event corresponds to said situation.

20. The computer according to claim 18, wherein the database engine is configured to use a query language that is responsive to one or more events received by the event unit for constructing a database query in real time.

21. The computer according to claim 20, wherein the query language uses SQL primitives.

22. The computer according to claim 20, wherein the query language includes an operand that operates on one or more database values and returns a logic TRUE or FALSE value according to whether said database values conform to a defined logic construct.

23. The computer according to claim 22, wherein said logic construct is constructed using SQL primitives.

24. A computer implemented method for use in an event-driven application for establishing a situation having at least one external constraint associated therewith, said method comprising:

(a) receiving one or more events,
(b) processing said events for generating a composite event relating to said situation;
(c) executing a database query for obtaining auxiliary data related to the at least one external constraint;
(d) evaluating the situation using the auxiliary data and the composite event so as to limit a scope of the composite event to specific instances that match the database query; and
(e) feeding data representative of the situation to an external device that is responsive to said situation being detected.

25. The method according to claim 24, wherein querying the external database includes using a query language to construct in real time a database query based on the composite event.

26. The method according to claim 25, wherein the query language uses SQL primitives.

27. The method according to claim 25, wherein the database query is a static query using constant query parameters.

28. The method according to claim 25, wherein the database query is a dynamic query using query parameters that change during run time.

29. The method according to claim 25, wherein the query language includes an operand that operates on one or more database values and returns a logic TRUE or FALSE value according to whether said database values conform to a defined logic construct.

30. The method according to claim 29, wherein said logic construct is constructed using SQL primitives.

* * * * *